United States Patent [19]

Brignac et al.

[11] Patent Number: 4,485,188
[45] Date of Patent: Nov. 27, 1984

[54] PREPARATION OF POLYMETALLIC CATALYSTS

[75] Inventors: David G. Brignac, Hester; George A. Swan, Baton Rouge, both of La.

[73] Assignee: Exxon Research and Engineering Co., Florham Park, N.J.

[21] Appl. No.: 499,207

[22] Filed: May 31, 1983

[51] Int. Cl.$^3$ .................... B01J 27/02; C10G 35/06
[52] U.S. Cl. .................................. 502/215; 208/138
[58] Field of Search .......................... 502/215

[56] References Cited

U.S. PATENT DOCUMENTS

| | | | |
|---|---|---|---|
| 3,310,599 | 3/1967 | Haensil et al. ................. | 502/215 X |
| 3,538,161 | 11/1970 | Dovell ............................ | 502/215 X |
| 4,149,991 | 4/1979 | Eberly, Jr. .................... | 502/215 |
| 4,169,785 | 10/1979 | Eberly, Jr. ...................... | 502/230 X |
| 4,369,129 | 1/1983 | Mauldin et al. .................... | 502/241 |

Primary Examiner—Delbert E. Gantz
Assistant Examiner—William G. Wright
Attorney, Agent, or Firm—Llewellyn A. Proctor

[57] ABSTRACT

A catalyst constituted of platinum, rhenium, and tellurium composited with a porous inorganic support material, especially alumina, is more selective in hydrocarbon conversion reactions, particularly reforming, or hydroforming, when pretreated in a sequence which includes the steps of oxidation and dry hydrogen reduction.

5 Claims, No Drawings

PREPARATION OF POLYMETALLIC CATALYSTS

BACKGROUND OF THE INVENTION

Reforming with hydrogen, or hydroforming, is a well established industrial process employed by the petroleum industry for upgrading virgin or cracked naphthas for the production of high octane products. Noble metal catalysts, notably platinum type catalysts to which additional metals have been added, are currently employed in reforming operations, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics, isomerization of n-paraffins; isomerization of substituted aromatics; and hydrocracking of paraffins to produce gas and coke.

In a typical process, a series of reactors are provided with fixed beds of catalyst which receive downflow feed, and each reactor is provided with a heater because the reactions which take place are endothermic. A naphtha feed, with hydrogen recycle gas, is concurrently passed sequentially through a reheat furnace and then to the next reactor of the series. The vapor effluent from the last reactor of the series is a gas rich in hydrogen, which usually contains small amounts of normally gaseous hydrocarbons, and it is separated from the $C_5^+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. The platinum group or Group VIII noble metals (ruthenium osmium, rhodium, iridium, palladium, and platinum), particularly platinum, despite their expense have been recognized as having a combination of properties which make them particularly suitable for reforming operations, and platinum in particular has become widely used in commercial operations. Conventional reforming catalysts have thus long employed platinum composited with an inorganic oxide base, particularly alumina, and in recent years one or more promoters such as iridium, rhenium, germanium, tin, selenium, tellurium, etc., have been added to platinum to enhance one or more of certain of the characteristics which a good reforming catalyst must possess—viz., good activity, selectivity, activity maintenance, and yield stability. Halogen, e.g., chlorine, is generally added to enhance the acid function required of the catalyst, and the catalysts are sulfided prior to use.

Sulfided platinum-rhenium catalysts possess satisfactory activity for use in reforming operations, activity being defined as that property which imparts the ability to produce aromatics, aromatic production (or octane improvement) generally being measured as a function of temperature, feed rate, etc. Sulfided platinum-rhenium catalysts also possess satisfactory selectivity which is defined as that property which imparts the ability of the catalyst to produce high yields of high octane number $C_5^+$ liquid products with concurrent low production of normally gaseous hydrocarbons, i.e., $C_1$-$C_4$ hydrocarbons, or solid carbonaceous by-products and coke. These catalysts also possess good stability or activity maintenance, i.e., activity plotted as a function of time, good stability or selectivity maintenance being defined as high retention of activity and selectivity, or continued high activity and stability for prolonged periods during reforming operations.

While any commercially viable reforming catalyst must possess all of these properties to a significant degree, no catalyst used in real world operations can possess all of these properties to the ultimate degree. One of these characteristics may be possessed by a catalyst in admirable degree, but the lesser quality of another of these characteristics may adversely affect the worth of the catalyst. Thus, a catalyst which possesses good selectivity does not necessarily have good activity, and vice versa. A small decrease in $C_5^+$ liquid yield can thus represent a large debit in commercial reforming operations. Conversely, the worth of a catalyst which possesses high selectivity may be jeopardized by the considerable capital cost which necessitates large charges of noble metals containing catalysts. Proper balance between these several properties is essential in the commercial world and an improvement gained in one property, or characteristic, cannot be too much offset by loss of another if the catalyst is to prove commercially viable.

In U.S. Pat. No. 4,149,991 and U.S. Pat. No. 4,169,785 there is disclosed catalyst composites which include platinum, rhenium, and tellurium for use in reforming. The addition of tellurium to platinum-rhenium reforming catalysts improves the activity of the catalysts. It also improves $C_5^+$ liquid yields by improving aromatics selectivity. Tellurium is analogous to sulfur in its action of suppressing hydrogenolysis when it is added to platinum-rhenium catalysts. A platinum-rhenium catalyst to which tellurium has been added, though it produces more methane and light gases than a sulfided platinum-rhenium catalyst, it produces greater yields of aromatics. For example, when a catalyst constituted of 0.3 wt. % Pt, 0.3 wt. % Re, and 0.06 wt. % Te which contained 1 wt. % chloride was placed in a reactor and used to reform a low sulfur (<0.1 ppm S) paraffinic feed at 895° F., 2.1 W/H/W, 150 psig, and 5000 SCF/B of hydrogen to produce a 100 RON product, the catalyst showed yield parity and substantial activity credits relative to a catalyst otherwise similar except that it was sulfided and contained no tellurium, run at similar conditions. Further, when the same platinum-rhenium-tellurium catalyst was employed in the last reactor of a multi-reactor unit at 950°-978° F. E.I.T. (equivalent isothermal temperature), 4.0 W/Hr/W, 140 psig, and 3600 SCF/B to produce a 100 RON product, a $C_5^+$ yield advantage was obtained at equivalent activity vis-a-vis a second, fully sulfided catalyst which contained 0.3 wt. % Pt and 0.3 wt. % Re at similar conditions. At these conditions, the latter sulfided catalyst would have been expected to provide better $C_5^+$ yield, but it did not due to the presence of the tellurium in the former catalyst. Hence, a platinum-rhenium-tellurium catalyst is known to provide at least equal or superior performance as contrasted with a sulfided platinum-rhenium catalyst containing the same weight distribution of platinum and rhenium metals.

Albeit the addition of tellurium has improved the performance of platinum-rhenium catalysts, further improvements of such catalysts are nonetheless desired; particularly catalysts of such character which will provide improved $C_5^+$ liquid yields.

Accordingly, it has now been discovered that a catalyst comprising catalytically active amounts of platinum, rhenium, and tellurium, composited with a porous inorganic base, notably alumina, is more selective, and more stable for producing high octane products from gasolines and naphtha at reforming conditions if it is pretreated in a sequence which includes the steps of oxidation and dry hydrogen reduction. The oxidation step is conducted by contacting the catalyst at an elevated temperature of at least about 850° F., or temperature sufficient to form rhenium oxide, or rhenium oxide and other metal oxides dispersed upon the catalytic surface. The hydrogen reduction step is thereafter conducted by contact of the catalyst with dry hydrogen at conditions sufficient to remove product water from the catalyst as it is produced, and the reduction is continued until the stream of hydrogen gas leaving said catalyst (i.e., the exit gas) contains less than about 1000 parts per million of moisture (water) by volume, preferably less than about 500 ppm water, and more preferably less than 200 ppm water. In practicing the invention, the duration of contact of the catalyst with dry hydrogen is continued until the catalyst becomes dry, or desiccated; this state being reached when the hydrogen leaving said catalyst contains less than 1000 ppm water, preferably less than 500 wppm water, and more preferably less than 200 ppm water. This means, of course, that the dry hydrogen used for the reduction must contain less than 1000 ppm moisture, or less than 500 ppm moisture, and more preferably the hydrogen should be considerably drier, and should contain no more than 100 ppm water, preferably less than 50 ppm water.

The catalyst, in conducting the oxidation step, is suitably contacted with a flowing gas stream of an oxygen-containing gas, preferably air, suitably at temperatures ranging from about 850° F. to about 1100° F., preferably at temperatures ranging from about 950° F. to about 1050° F. Suitably, the period of treatment ranges from about 2 hours to about 10 hours, preferably from about 3 hours to about 4 hours. In the reduction step the oxidized metal surface of the catalyst is suitably contacted with a flowing stream of dry hydrogen, or a dry hydrogen-containing gas, at a temperature above about 900° F., suitably at a temperature ranging from about 900° to about 1050° F., preferably from about 900° to about 1000° F. The time of reduction suitably ranges from about 0.5 hours to about 20 hours. Absolute pressures generally range from about atmospheric to about 400 pounds per square inch (psi), pressures ranging below about 100 psi being preferred.

The substantially complete reduction of the catalytic metal oxides to the zero valent state is believed to be essential, as disclosed in U.S. Pat. No. 4,369,129 which was issued Jan. 18, 1983 to Charles H. Mauldin and William C. Baird, Jr. This patent discloses a process for the pre-treatment of rhenium-containing catalysts, notably platinum-rhenium catalysts, in a sequence which necessarily includes the steps of oxidation, dry hydrogen reduction and sulfiding to obtain catalysts which provide higher performance, notably in increased $C_5^+$ liquid yields.

In accordance with the present invention it is only necessary to oxidize, and then reduce the platinum-rhenium-tellurium catalysts at temperatures greater than 850° F. to obtain highly active, highly selective catalysts. Improved $C_5^+$ liquid yields can be obtained in reforming with platinum-rhenium-tellurium catalysts subjected to the aforesaid oxidation, and reduction treatment steps. Sulfiding of the catalyst prior to its use in reforming is unnecessary. Surprisingly, performance of platinum-rhenium-tellurium catalysts treated in accordance with this invention is improved to a greater degree than corresponding platinum-rhenium catalysts.

The invention will be more fully understood by reference to the following demonstrations and non-limiting examples which present comparative data illustrating its more salient features. All parts are in terms of weight units unless otherwise specified.

EXAMPLE 1

Two platinum-rhenium-tellurium catalysts (0.30 wt. % Pt, 0.30 wt. % Re, 0.06 wt. % Te) in each of two separate runs were changed into a stainless steel reactor tube, and treated for 2 hours by passage of air thereover at 900° F. to assure complete oxidation of the metals dispersed on the surfaces of the two catalysts.

Each catalyst, Catalyst A and B, respectively, after oxidation was reduced by treatment with a hydrogen or hydrogen-containing stream containing <50 vppm water in accordance with the following schedules, to wit:

(1) Catalyst A: a mild reduction at 700° F. with 1.5 mole percent $H_2$ for 18 hours; and (2) Catalyst B: a severe reduction at 932° F. with 100 mole percent hydrogen for 18 hours;

and comparison runs then made by reforming a particular reference light paraffinic naphtha feed in simulations corresponding to a use of the catalyst in the last reactor of a four reactor series. The feed is characterized in Table I.

TABLE I

| ASTM Distillation, °F. | |
|---|---|
| Initial | 114 |
| 10 | 178 |
| 20 | 194 |
| 30 | 209 |
| 40 | 224 |
| 50 | 238 |
| 60 | 259 |
| 70 | 280 |
| 80 | 302 |
| 90 | 328 |
| Final B.P. | 406 |
| Octane No. RON Clear | 94.4 |
| Gravity, °API | 47.9 |
| Sulfur, Wt. ppm | <0.1 |
| Water, Wt. ppm | <5.0 |
| Chloride, Wt. ppm | <0.1 |
| Analysis, Vol. Percent | |
| Paraffins | 42.78 |
| Naphthenes | 2.27 |
| Aromatics | 54.95 |

A run was made with each catalyst at 950°-978° F. (E.I.T), 4.0 W/H/W, 140 psig, 3600 SCF/B of hydrogen, to produce a 100 RON product. Comparisons of the yields of the catalysts run are given in Table II, and a comparison of the relative activities of the catalysts are given in Table III.

TABLE II

| | $C_5^+$ Liquid Yield Wt. % at 100 RON (Hours On Oil) | | | | | |
|---|---|---|---|---|---|---|
| | 0 | 20 | 40 | 60 | 80 | 100 |
| Catalyst A | 87.8 | 88.0 | 88.0 | 88.2 | 89.0 | 88.8 |
| Catalyst B | 91.8 | 92.0 | 91.0 | 90.6 | 90.6 | 90.2 |

TABLE III

| | Relative Activity Hours On Oil | | | | |
|---|---|---|---|---|---|
| | 4 | 16 | 36 | 64 | 100 |
| Catalyst A | 5.38 | 5.12 | 5.15 | 4.64 | 4.40 |
| Catalyst B | 5.65 | 5.45 | 5.22 | 5.00 | 4.80 |

It is clear that oxidation, followed by the severe pre-reduction treatment provides substantial catalyst performance improvement. $C_5^+$ liquid yields were increased by an average of 2.7 wt. %, and catalyst activity was increased by about 40% in the use of Catalyst B vis-a-vis Catalyst A.

EXAMPLE 2

A platinum-rhenium-tellurium catalyst (0.3 wt. % Pt, 0.67 wt. % Re, and 0.06 wt. % Te), Catalyst C, and a platinum-rhenium catalyst (0.3 wt. % Pt, 0.67 wt. % Re), Catalyst D, were each treated by mild oxidation in a quartz reactor tube with air at 950° F. as described in Example 1.

Portions of each of the oxidized catalysts, i.e., Catalyst C and Catalyst D, were then reduced at two different sets of conditions, to wit:

(1) a mild reduction at 842° F., for one-half hour with hydrogen containing <50 vppm water; and (2) a severe reduction at 932° F. for 16 hours with hydrogen containing <50 vppm water.

An n-heptane feed was then processed in a stainless steel reaction tube over these catalysts at 100 psig, 10 W/H/W, $H_2$:Oil=5 and 932° F. The methane, and the $C_5^+$ liquid yields were then determined, as given in Table IV.

TABLE IV

| | Catalyst C | | Catalyst D | |
|---|---|---|---|---|
| | Mild Reduction | Severe Reduction | Mild Reduction | Severe Reduction |
| Toluene Formation Rate G/Hr/G | 1.40 | 2.45 | 1.55 | 2.45 |
| Toluene Selectivity | 29.1 | 41.0 | 25.1 | 33.3 |
| Hydrogenolysis Rate G/Hr/G | 0.30 | 0.25 | 1.30 | 0.85 |
| $C_5^+$ Yields, Wt. % | 80.4 | 80.2 | 69.1 | 72.1 |

These data clearly show that severe reduction greatly improves the tellurium modified platinum-rhenium catalyst, i.e., Catalyst C, as compared with the corresponding severe treatment of the unmodified platinum-rhenium catalyst, i.e., Catalyst D. The severely reduced tellurium modified catalyst has superior toluene selectivity, reduced hydrogenolysis rate, and higher $C_5^+$ liquid yields than its unmodified platinum-rhenium counterpart. As expected, toluene formation rate improved in both cases, but toluene selectivity increased substantially for Catalyst C following severe reduction, whereas the toluene selectivity improvement was less for severely reduced Catalyst D. Furthermore, the rate of hydrogenolysis remained unacceptably high for Catalyst D despite the severe reduction, whereas the severe reduction treatment further lowered the hydrogenolysis rate with Catalyst C. Thus, Catalyst C provides both higher aromatics selectivity and $C_5^+$ yields compared with Catalyst D.

A catalyst composition particularly suitable for pretreatment in accordance with this invention is one which comprises from about 0.05 to about 3 percent platinum, preferably from about 0.1 to about 1 percent platinum, from about 0.05 to about 3 percent rhenium, generally from about 0.1 to about 1 percent rhenium, and from about 0.01 to about 1 percent tellurium, preferably from about 0.05 to about 0.30 percent tellurium, based on the total weight (dry basis) of the composition.

The metals components are composited with a support material, suitably mildly or moderately acidic refractory inorganic oxides, e.g., silica, silica-alumina, magnesia, thoria, boria, titania, zirconia, various spinels and the like, including, in particular, alumina, and more particularly gamma alumina, which species are preferred. High surface area catalysts, or catalysts having surface areas ranging upwardly from about 10, and preferably 100 m²/g (B.E.T.) are preferred. In particular, catalysts having surface areas ranging from about 150 to about 600 m²/g prove quite satisfactory.

The platinum, rhenium, and tellurium can be composited or intimately associated with the porous inorganic oxide support by various techniques known to the art such as ion-exchange, coprecipitation, or physical mixing of fine particles with the alumina in the sol or gel form, etc. For example, the catalyst composite can be formed by adding together suitable reagents such as water soluble salts of platinum, rhenium, and tellurium and ammonium hydroxide or ammonium carbonate, and a salt of aluminum such as aluminum nitrate, aluminum sec-butoxide, or aluminum sulfate to form aluminum hydroxide. When the metals are included in the preparation of the support, higher concentrations of the metals are often necessary. The aluminum hydroxide containing the salts of platinum, rhenium, and tellurium can then be heated, dried, formed into pellets or extruded, and then calcined in nitrogen or nonagglomerating atmosphere. The platinum can be added to the support, then the rhenium, and then the tellurium added. Or the tellurium can be added, then the rhenium can be added, and then the platinum added. Suitably, platinum, rhenium, tellurium, and halogen are added simultaneously and the catalyst then dried. On the other hand, if the platinum, rhenium, and tellurium have already been added as by co-precipitation from an alumina gel, the halide can be subsequently added, e.g., by impregnation from an aqueous HCl solution, or by gas phase chlorination with an HCl-$Cl_2$ mixture or other halide precursor.

Essentially any hydrocarbon fraction containing paraffins, naphthenes, and the like, admixed one with the other or in an admixture with other hydrocarbons, can be converted by means of the catalyst of this invention. A suitable feed can be a virgin naphtha, cracked naphtha, a Fischer-Tropsch naphtha or the like, or mixtures thereof. The feed is contacted at reforming conditions in the presence of hydrogen (once-through, or recycle) with a catalyst composite including a support which contains catalytically active amounts of the metals. Typical feed stream hydrocarbon molecules are those containing from about 5 to about 12 carbon atoms, or more preferably from about 6 to about 12 carbon atoms, or more preferably from about 7 to about 10 carbon atoms. Naphthas, or petroleum fractions, boiling within the range of from about 80° F. to about 450° F., and preferably from about 125° F. to about 375° F., contain hydrocarbons or carbon numbers within these ranges. Typical fractions thus usually contain from about 20 to about 80 volume percent of paraffins, both normal and branched, which fall in the range of about $C_5$ to $C_{12}$, and from about 20 to about 80 volume percent of naphthenes boiling within the range of about $C_6$ to $C_{12}$. Typical feeds generally contain from about 5 through about 20 volume percent of aromatics which boil within the range of about $C_6$ to $C_{12}$, typically as produced in the product from the naphthenes and paraffins.

Having described the invention, what is claimed is:

1. A process for the pretreatment and activation of an unsulfided platinum-rhenium-tellurium reforming catalyst for use in reforming a naphtha feed which comprises the steps of contacting said catalyst with an oxygen-containing gas at temperatures ranging from about 850° F. to about 1100° F., and then contacting said rhenium oxide-containing catalyst with a stream of substantially dry hydrogen gas at a temperature ranging from about 900° F. to about 1050° F., maintaining contact between said dry hydrogen gas and said catalyst for at least 2 hours, or until the moisture level of the gas stream leaving said catalyst is less than about 1000 ppm by volume.

2. The process of claim 1 wherein said oxidation step is conducted by contacting said catalyst with a flowing stream of an oxygen-containing gas at temperatures ranging from about 950° F. to about 1050° F., and the reduction step is conducted at a temperature ranging from about 900° F. to about 1000° F. for a period ranging from about 0.5 to about 20 hours.

3. The process of claim 1 wherein the time of the oxidation treatment ranges from about 3 hours to about 4 hours.

4. The process of claim 1 wherein the flowing stream of gas is air.

5. The process of claim 1 wherein said oxidation step is conducted by contacting said catalyst with a flowing stream of an oxygen-containing gas at temperatures ranging from about 950° F. to about 1050° F., the time of the treatment ranges from about 2 hours to about 10 hours, air is employed as the treating gas, and the reduction step is conducted at a temperature ranging from about 900° F. to about 1000° F. for a period ranging from about 0.5 to about 10 hours.

* * * * *